(12) United States Patent
Araya et al.

(10) Patent No.: US 9,213,541 B2
(45) Date of Patent: Dec. 15, 2015

(54) CREATION, GENERATION, DISTRIBUTION AND APPLICATION OF SELF-CONTAINED MODIFICATIONS TO SOURCE CODE

(75) Inventors: Carlos Araya, Cartago (CR); Federico Zoufaly, San Jose (CR); Rick Laplante, Powell, WY (US); Oscar Calvo, Duval, WA (US)

(73) Assignee: ArtinSoft Corporation, S.A., Road Town, Tortola (VG)

( * ) Notice: Subject to any disclaimer, the term of this patent is extended or adjusted under 35 U.S.C. 154(b) by 1824 days.

(21) Appl. No.: 12/425,865

(22) Filed: Apr. 17, 2009

(65) Prior Publication Data

US 2010/0269096 A1    Oct. 21, 2010

(51) Int. Cl.
G06F 9/44    (2006.01)
G06F 17/30    (2006.01)
G06F 9/45    (2006.01)
G06F 17/24    (2006.01)

(52) U.S. Cl.
CPC .......... *G06F 8/71* (2013.01); *G06F 17/30938* (2013.01); *G06F 8/51* (2013.01); *G06F 8/75* (2013.01); *G06F 17/24* (2013.01)

(58) Field of Classification Search
CPC ....... G06F 17/30938; G06F 8/51; G06F 8/71; G06F 8/75; G06F 17/24
USPC ................... 717/110, 136, 113, 144
See application file for complete search history.

(56) References Cited

U.S. PATENT DOCUMENTS

| | | | |
|---|---|---|---|
| 5,649,200 A * | 7/1997 | Leblang et al. | 717/122 |
| 6,195,792 B1 * | 2/2001 | Turnbull et al. | 717/110 |
| 6,851,105 B1 | 2/2005 | Coad | |
| 6,961,931 B2 * | 11/2005 | Fischer | 717/168 |
| 7,185,330 B1 * | 2/2007 | Khu | 717/160 |
| 2002/0016954 A1 * | 2/2002 | Charisius et al. | 717/2 |
| 2005/0166193 A1 * | 7/2005 | Smith et al. | 717/143 |
| 2006/0053410 A1 * | 3/2006 | Charisius et al. | 717/109 |
| 2006/0156286 A1 * | 7/2006 | Morgan et al. | 717/124 |
| 2008/0082962 A1 * | 4/2008 | Falk et al. | 717/113 |

OTHER PUBLICATIONS

"Aggiorno's Smart Search and Replace language specification", Nov. 7, 2008, 19 pages, United States.

(Continued)

*Primary Examiner* — Ted T Vo
*Assistant Examiner* — Mohammed Huda
(74) *Attorney, Agent, or Firm* — Blank Rome, LLP

(57) ABSTRACT

Systems for creating, generating, distributing and applying self-contained modifications (i.e., changes) to source code are described herein. At least some embodiments include a system including a client computer with processing logic, a storage device (including source code files), and a communication interface. The interface receives a container file including a transformation including a search pattern that identifies source code segments, and transformation instructions that modify the source code based at least partially on identified code segments. Processing logic software searches a representation of the source code for search pattern occurrences, and identifies the source code segments that include elements with structure and relationships that are matched by the corresponding elements represented by the search pattern. The software further modifies at least part of the source code representation according to the transformation instructions, and saves onto the storage device source code files reflecting the application of the transformation.

24 Claims, 10 Drawing Sheets

(56) References Cited

OTHER PUBLICATIONS

Michael Kay, "What kind of language is XSLT?", Feb. 1, 2001, 9 pages, http://www.ibm.com/developerworks/library/x-xslt/.

Ira D. Baxter, "Restructuring Web Applications via Transformation Rules", 11 pages.

Ira D. Baxter, "Design Maintenance Systems", Apr. 1992, pp. 73-89, Communications of the ACM, vol. 35, No. 4.

Zoufaly, Federico, et al.; RESCUE: Legacy Systems Translator; ArtInSoft S.A.; WCRE '95 Proceedings of the Second Working Conference on Reverse Engineering IEEE Computer Society Washington, DC, USA © 1995, ISBN:0-8186-7111-4.

* cited by examiner

CREATION, GENERATION, DISTRIBUTION AND APPLICATION OF SELF-CONTAINED MODIFICATIONS TO SOURCE CODE

BACKGROUND

The proliferation of the Internet has spawned an unprecedented level of information exchange. Computer programmers have been particularly successful at taking advantage of such exchanges, forming and participating in peer discussion groups. Participants in such groups frequently propose new and better ways of writing programs that process data, or of organizing the data itself, and these proposals are quickly analyzed and critiqued by other programmers. In such an environment, ideas that work well are quickly adopted, and those that don't are promptly discarded. Many of the better ideas end up published in books and magazines, and extensively posted on Internet websites. In this manner, online communities can cooperatively develop, disseminate, maintain and improve those algorithms and data structures that work best for a given purpose over a variety of applications, what is sometimes referred to as "best practices." Such an approach may also be used by standards groups to develop and disseminate specific programming and data representation recommendations for use within a standard (i.e., specific "best practices" for implementing a standard), and to maintain and improve such recommendations. This described process of incorporating changes to the structure of a program or data structure without modifying its external functional behavior or existing functionality is sometimes referred to as "code refactoring." In the more general case, wherein the changes do not necessarily preserve behavior or functionality (e.g., changes made with specific business objectives in mind), the described process is sometimes referred to as "code transformation," and the description of such a code transformation is sometimes referred to as a "knowledge capsule."

The rapidly accelerating ability to disseminate both new and improved methods and data structures for use as code transformations (with the goal of improving the business or technical value of source code), however, has proven to be both advantageous and problematic. While it is extremely advantageous for a programmer to have immediate access to what is essentially a continuously growing worldwide database of knowledge capsules, and to a continuous stream of improvements and updates to such knowledge capsules, the ongoing increase in the number, sophistication and update frequency of knowledge capsules can rapidly outpace a programmers ability to assimilate the knowledge capsules, to identify code that is affected by the knowledge capsules, to properly apply the knowledge capsules to source code, and to test the modified code, a process that for the most part is performed manually by the programmer.

Further, much of the actual dissemination of such knowledge capsules is also performed manually. Knowledge capsules are published in books and magazines and posted on Internet websites where they can be reviewed and (optionally) downloaded by programmers for later incorporation into both new and existing programs and data structures. Additionally, although tools do exist to assist a programmer in identifying code segments to which a knowledge capsule may apply (e.g., advanced search and replace tools that are part of a code maintenance system), such systems still require that each individual user specify the search criteria (i.e., heuristics or "code smells" that identify code possibly needing the modifications or changes embodied in the knowledge capsule). This effort can take a significant amount of time, is prone to errors, may not identify all of the candidate code segments (depending upon how well the search criteria is constructed), and creates an enormous duplication of effort among programmers.

SUMMARY

Systems for creating, generating, distributing and applying self-contained modifications (i.e., changes) to source code are described herein. At least some embodiments include a system for modifying source code files, including a client computer that includes processing logic, a storage device (coupled to the processing logic) that includes one or more source code files with source code, and a communication interface coupled to the processing logic and configured to couple to a communication network. The communication interface receives a container file including a transformation that includes a search pattern used to identify one or more code segments of the source code, and one or more transformation instructions used to modify the source code based at least in part on the one or more identified code segments. Software executing on the processing logic searches a representation of the structure and relationships of elements of the source code for occurrences of the search pattern, and identifies the one or more code segments of the source code that include elements with a structure and relationships that are matched by the corresponding elements represented by the search pattern. The software further modifies at least part of the representation of the structure and relationships of the elements of the source code according to the one or more transformation instructions, and further saves onto the storage device one or more source code files that reflect the application of the transformation to the source code.

Other embodiments include a computer-readable storage medium that includes software that can be executed on a processor to cause the processor to select a transformation that includes a search pattern and one or more transformation instructions, and to apply the search pattern to a representation of the structure and relationships of the elements of source code stored within a source code file (to identify one or more code segments within the source code comprising elements with a structure and relationships that are matched by the structure and relationships of corresponding elements represented by the search pattern). The software further causes the processor to modify a representation of the structure and relationships of elements of the source code according to the transformation instructions (based at least in part on the one or more identified code segment), and to store one or more source code files that reflect the application of the transformation to the source code.

Still other embodiments include a computer-readable storage medium that includes software that can be executed on a processor to cause the processor to generate a container file configured to modify source code stored within a source code file, and to further cause the processor to save the container file to a storage device that is accessible over a communication network. The container file includes a search pattern used to identify one or more code segments comprising elements with a structure and relationships that are matched by the structure and relationships of corresponding elements represented by the search pattern, and one or more transformation instructions that operate to modify source code based at least in part on the one or more identified code segments.

BRIEF DESCRIPTION OF THE DRAWINGS

For a detailed description of at least some embodiments, reference will now be made to the accompanying drawings in which.

DETAILED DESCRIPTION

Figure 1:
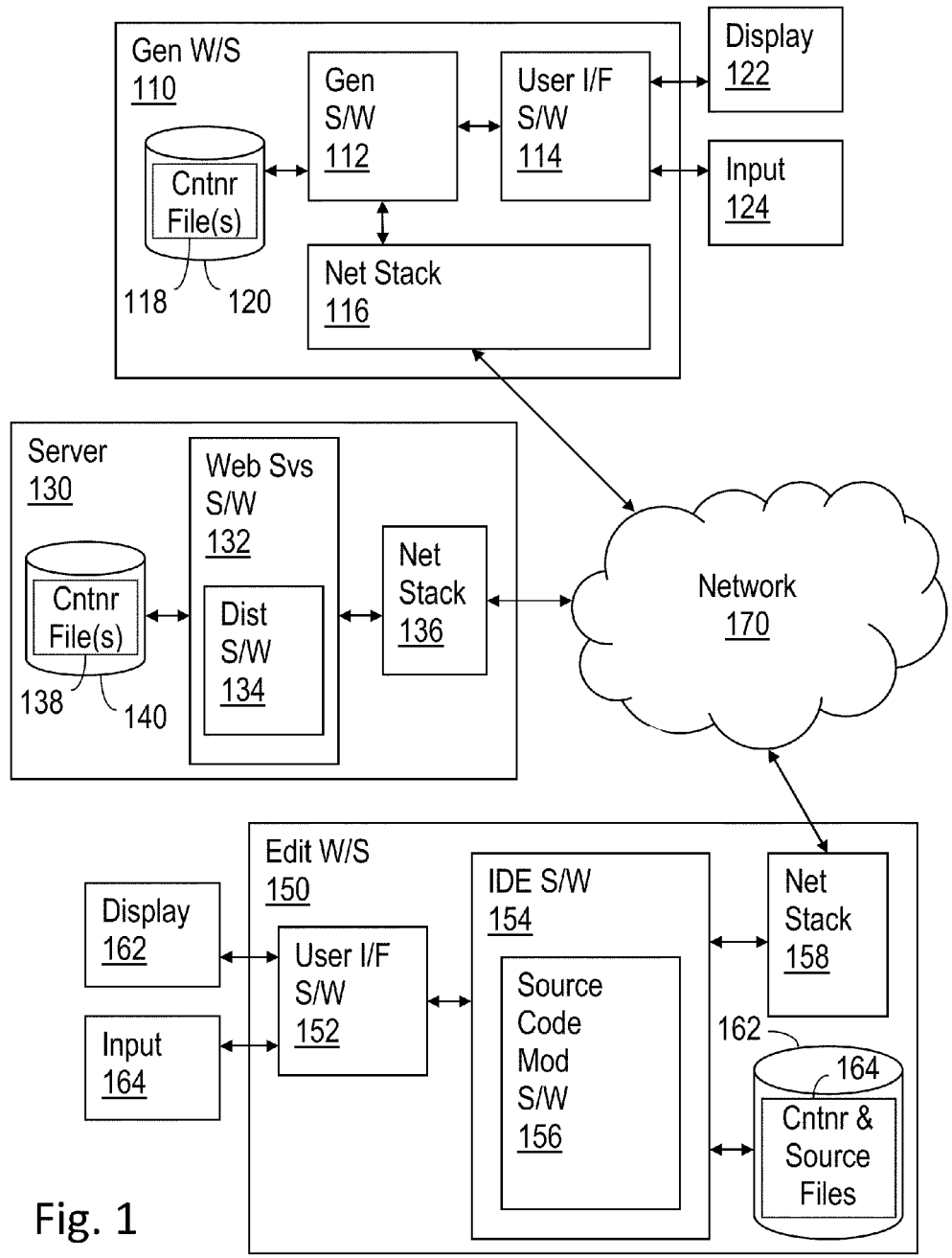
FIG. 1 shows a block diagram of a system for creating, generating, distributing and applying transformations within container files used to modify source code files, in accordance with at least some embodiments.

FIG. 1 shows an example of an embodiment of a system for creating, generating, distributing and applying self-contained transformations that each implements a knowledge capsule. Such transformations are embodied within container files that are encoded as executable images. Generation workstation (Gen W/S) 110 includes generation software (Gen S/W) 112, which executes on the workstation under the control of a user operating the workstation using input device (Input) 124 and display device (Display) 122, via user interface software (User I/F S/W) 114. Generation software 112 enables a user to create one or more transformations that are incorporated into one or more container files (Cntnr File(s)) 118 (described in detail below), which are stored on storage device 120.

Generation software 112 may be a text editor (e.g., Microsoft® Word) used to produce a transformation expressed as text conforming to the rules and syntax of a programming language that is subsequently compiled and incorporated into a container file. Alternatively, generation software 112 may be an integrated program development tool (e.g., Microsoft® Visual Studio) used to create, compile and link one or more transformations, thus incorporating the transformation into a container file. Nonetheless, those of ordinary skill in the art will recognized that other more sophisticated implementations of generation software 112 may be developed for creating transformations and incorporating such transformations into one or more container files (e.g., software that enables a user to graphically edit an abstract syntax tree (AST) representing a program, or a document object model (DOM) representing a web page, and which may automatically create transformations from such edits and incorporates the transformations into one or more container files), and all such variations of generation software 112 are contemplated by the present disclosure.

Generation software 112 interacts with network protocol stack (Net Stack) 116, enabling generation software 112 to communicate with software executing on other workstations and servers. In the example embodiment shown in FIG. 1, generation software 112 causes generation workstation 110 to establish a communication channel with server 130 over which one or more container files are transmitted from workstation 110 to server 130 (e.g., using the File Transfer Protocol (FTP)) across network 170 (e.g., across the Internet). Server 130 stores one or more container files (Cntnr File(s)) 138 received from generation workstation 110 on storage device 140. Server 130 further executes web services software (Web Svs S/W) 132 (e.g., Apache HTTP server software) which includes distribution software (Dist S/W) 134. Other embodiments (not shown) are also contemplated wherein distribution software 134 executes as a stand-alone software program that may either communicate directly with network protocol stack (Net Stack) 136, or with web services software 132 (which communicates with Net Stack 136).

Distribution software 134 operates to automatically distribute or "push" container file(s) 138 across network 170 to one or more editing workstations (e.g., editing workstation (Edit W/S) 150) for use by users that, for example, have a subscription to receive transformations within such container files. Alternatively, the stored container file(s) 138 may be made available by web services software 132 for download on demand by a user operating an edit workstation (e.g., by a user operating web browser software to "pull" down the file). Regardless of whether pushed or pulled from server 130, container file(s) 138 are transmitted from server 130 across network 170 to edit workstation 150. Although the example illustrated in FIG. 1 shows generation workstation 110 and server 130 as separate devices, those of ordinary skill in the art will recognize that the functionality of these devices may be implemented in a single workstation/server device that both generates the container file(s) and provides the container file(s) to an edit workstation, and all such variations and combinations of generation workstations and servers are contemplated by the present disclosure.

Continuing to refer to FIG. 1, one or more container files are received at editing workstation 150 and stored on storage device 162 (as part of container and source files (Cntnr & Source Files) 164). In the example embodiment shown, integrated development environment software (IDE S/W) 154 executes on editing workstation 150 and includes source code modification software (Source Code Mod S/W) 156. IDE software 154 interacts with user interface software (User I/F S/W) 152, which enables the user to operate IDE software 154 and source code modification software 156 using input device (Input) 164 and display device (Display) 162. IDE software 154 also interacts with network protocol stack (Net Stack) 158, which enables IDE software 154 to cause editing workstation 150 to establish communication channels with other devices (e.g., server 130) and to communicate with software executing on such other devices across network 170 (e.g., with web services software 132 executing on server 130).

In the example embodiment of FIG. 1, source code modification software 156 is implemented as an "add-on" to integrated development environment 154 (e.g., as an add-on to Microsoft® Visual Studio) that enables the user to access container file(s) 138 stored on server 130, to initiate on-demand downloads of the container file(s) to the editing workstation, and to store the received container file(s). Alternatively, source code modification software 156 operates to respond to container file transfers initiated automatically by distribution software 134 (executing on server 130 as described above), and to store the received container file(s) on storage device 162. In other embodiments (not shown) source code modification software 156 performs the same functions described above, but as a stand-alone executable program (i.e., without IDE software 154) interacting directly with network protocol stack 158 and user interface software 152. In yet other embodiments (also not shown), a stand-alone agent program executes as a service on editing workstation 150, providing the capability of receiving container files that are automatically "pushed" by distribution software 134 (executing on server 130) to editing workstation 150, without the need for source code modification software 156 to be executing at the time of the push, or even the need for a user to be present and operating the workstation (i.e., the agent is executed in background when editing workstation 150 boots). Once the container file(s) is received, the transformations(s) within the container file may be extracted and applied to source files by the user operating editing workstation 150, as described in detail below.

Figure 2A:
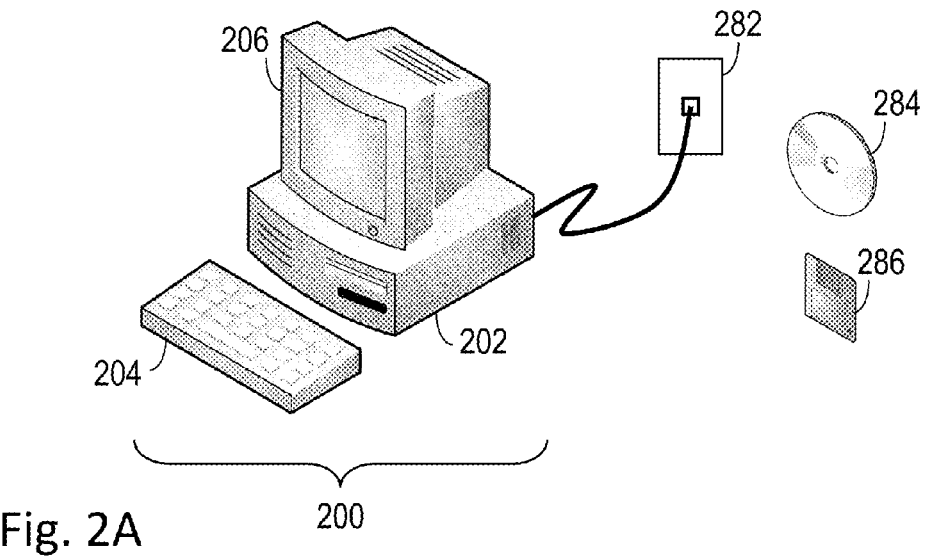
FIG. 2A shows an example of a computer system suitable for use as container file generation workstation, a container file server and a source code editing workstation, in accordance with at least some embodiments.
Figure 2B:
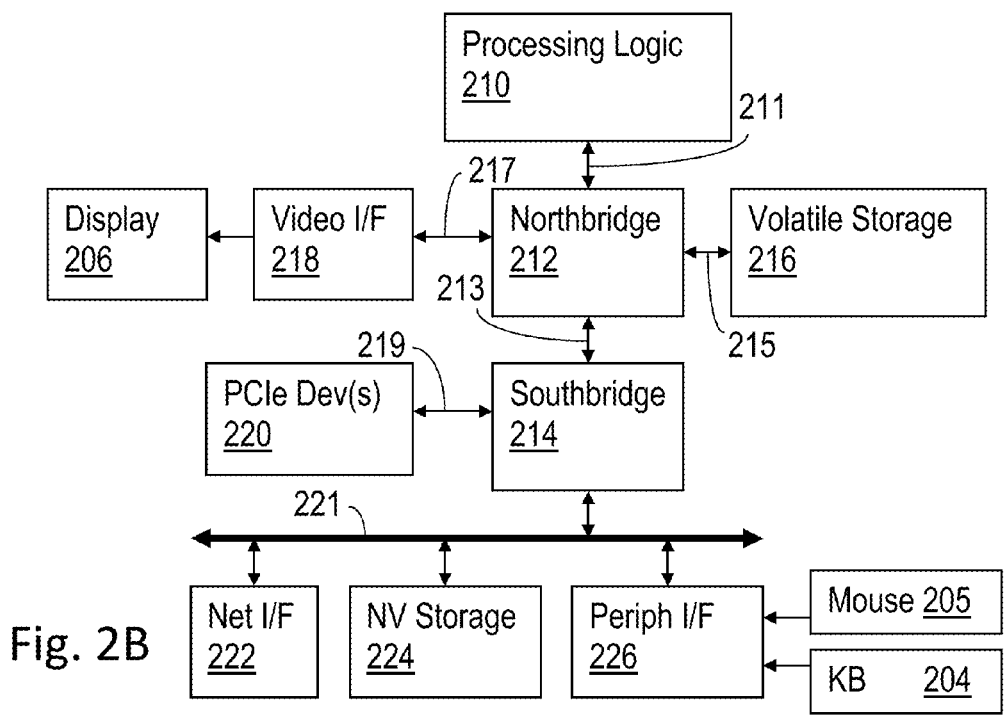
FIG. 2B shows a block diagram of the computer system of FIG. 2A, in accordance with at least some embodiments.

FIGS. 2A and 2B show a computer system suitable for use as the generation workstation 110, server 130 and/or editing workstation 150 of FIG. 1, in accordance with at least some embodiments. As shown, the computer system 200 includes a system unit 202, a keyboard 204 and a display 206. System unit 202 encloses processing logic 210, volatile storage 216 and non-volatile storage (NV Storage) 224. Processing logic 210 may be implemented in hardware (e.g., as one or more microprocessors that each may include one or more processor cores), in software (e.g., microcode), or as a combination of hardware and software. Volatile storage 216 may include a computer-readable storage medium such as random access memory (RAM). Non-volatile storage 224 may include a computer-readable medium such as flash RAM, read-only memory (ROM), electrically erasable programmable ROM (EEPROM), a hard disk, a floppy disk, (e.g., floppy disk 286), a compact disk ROM (i.e., CD-ROM, e.g., CD 284), and combinations thereof.

The computer-readable storage media of both volatile storage 216 and non-volatile storage 224 each includes software that may be executed by processing logic 210, and which provides computer system 200 with some or all of the functionality described in the present disclosure. Computer system 200 also includes a network interface, (Net I/F) 222, which enables computer system 200 to transmit and receive information via a local area network and/or a wired or wireless wide area network, represented in FIG. 1A by Ethernet jack 282. Alternatively, network interface 222 may be a wireless interface (not shown), instead of the wired interface shown if FIG. 1A. Video interface (Video I/F) 218 couples to display 206. A user interacts with computer system 200 via keyboard (KB) 204 and mouse 205 (or alternatively, any similar data entry and/or pointing device), which each couples to peripheral interface (Periph I/F) 226. Display 206, together with keyboard 204 and/or mouse 205, operate together to provide the user interface hardware of computer system 200.

Computer system 200 may be a bus-based computer, with a variety of busses interconnecting the various elements shown in FIG. 2B through a series of hubs and/or bridges, including Northbridge 212 (sometimes referred to as a memory hub controller (MCH) or an integrated memory controller (IMC)) and Southbridge 214 (sometimes referred to as an I/O Controller Hub (ICH) or a Platform Controller Hub (PCH)). The busses of the example of FIG. 2B include: front-side bus 211 coupling processing logic 210 to Northbridge 212; graphics bus 217 (e.g., an accelerated graphics port (AGP) bus or a peripheral component interface (PCI) express x16 bus) coupling video interface 218 to Northbridge 212; PCI bus 221 coupling network interface 222, non-volatile storage 224, peripheral interface 226 and Southbridge 214 to each other; PCI express (PCIe) bus 219 coupling one or more PCI express devices (PCIe Dev(s)) 220 to Southbridge 214; bridge interconnect bus 213 (e.g., an Intel® Direct Media Interface (DMI)) coupling Northbridge 212 and Southbridge 214 to each other; and memory bus 215 coupling Northbridge 212 to volatile storage 216.

Peripheral interface 226 accepts signals from keyboard 204 and/or mouse 205 and transforms the signals into a form suitable for communication on PCI bus 221. Video interface 218 (e.g., a PCIe graphics adapter) accepts signals from graphics bus 217 and transforms the signals into a form suitable for display 206. Processing logic 210 gathers information from other system elements, including input data from peripheral interface 226, and program instructions and other data from non-volatile storage 224 and volatile storage 216, or from other systems (e.g., a server used to store and distribute copies of executable code) coupled to a local or wide area network via network interface 222. Processing logic 210 executes the program instructions (e.g., source code modification software 156 of FIG. 1), and processes the data accordingly. The program instructions may further configure the processing logic 210 to send data to other system elements, such as information presented to the user via video interface 218 and display 206. Network interface 222 enables processing logic 210 to communicate with other systems via a network (e.g., the Internet). Volatile storage 216 may operate as a low-latency repository of information for processing logic 210, while non-volatile storage 224 may operate as a long-term (but higher latency) repository of information (e.g., for storage of container and source files 164 in FIG. 1).

Processing logic 210, and hence computer system 200 as a whole, operates in accordance with one or more programs stored on non-volatile storage 224 or received via network interface 222. Processing logic 210 may copy portions of the programs into volatile storage 216 for faster access, and may switch between programs or carry out additional programs in response to user actuation of keyboard 204 and/or mouse 205. The additional programs may also be retrieved from non-volatile storage 224, or may be retrieved or received from other locations via network interface 222. One or more of these programs execute on computer system 200, causing the computer system to perform at least some of the functions described herein.

Although the embodiments described include software executing on individual, self contained physical computers, software that implements the functionality described herein is not limited to such physical computers. Those of ordinary skill in the art will recognize that other implementations of a computer system may be suitable for executing software that implements the functionality herein. These may include virtualized computer systems (e.g., systems implemented using VMWare Workstation software by VMware®), and distributed computer systems (e.g., diskless workstations and netbooks), just to name a few examples. All such implementations and variations of a computer system are contemplated by the present disclosure.

As already noted, the container file(s) generated by generation workstation 110, distributed by server 130, and utilized by editing workstation 150 of FIG. 1 each includes one or more transformations. Each transformation may be implemented as a function within an executable container file. In at least some embodiments, the executing container file accepts request from a standard input (e.g., the stdin device in a UNIX or Microsoft® Windows O/S environment), directs the request to the appropriate function (i.e., to an appropriate function associated with a transformation), and outputs responses to a standard output (e.g., the stdout device in a UNIX or Microsoft® Windows O/S environment). In other example embodiments, the container file may include a separate set of functions that allow the available transformations within the container file to be listed and/or extracted for storage within a database or library. For example, in at least some embodiments the transformations are encoded as one or more functions that may be selectively added to a dynamic link library (DLL) for use in a Microsoft® Windows environment. In yet other example embodiments, the container file is itself a dynamic link library, with each transformation encoded as one or more functions within the DLL. The container DLL is accessed by registering the DLL with the operating system (e.g., Microsoft® Windows), which makes the transformation functions accessible for use by other programs (e.g., for use by an add-in module within Microsoft® Visual Studio that operates to apply the transformation(s) to source code under the control of a user).

Each transformation (through its associated encoded functions) accepts and responds to requests that command the transformation to perform various operations. In at least some example embodiments such operations include: identifying one or more code segments identified by a search pattern encoded within the transformation; modifying source code, based at least in part on the identified code segments, according to one or more transformation instructions encoded within the transformation; and "explaining" the transformation by accessing and extracting text encoded within the transformation that describes characteristics of the transformation (e.g., the purpose of the transformation, the improvements achieved over the code being replaced, and the originator of the transformation).

The transformation functions that are compiled to produce the container file(s) may be written in any of a number of computer languages. In at least some example embodiments, the Aggiorno Smart Search and Replace language by ArtinSoft® (described in the Aggiorno Smart Search and Replace Language Specification of Nov. 7, 2008, available at http://www.aggiorno.com/files/sar/aggirno-smart-search-replace-specification.pdf, herein incorporated by reference, and hereinafter referred to as "SSRL") is used to encode one or more search and replace patterns that implement such functions. The search patterns operate to identify one or more code segments to which the transformation may apply, and the replace patterns operate as transformation instructions that operate to replace, modify and/or add source code based at least in part on the one or more code segments (or portions of the one or more code segments) identified by the search patterns. The code segments may be part of the source code that is modified, or may simply identify a structure that allows identification of the source code to be modified (e.g., using the condition within an "if-then-else" statement to identify a code segment to be modified, but only modifying, or adding to, the instructions executed within the scope of the "else" clause without modifying the condition used to identify the code segment). The search and replace strings (i.e., search patterns and transformation instructions) defined within one or more functions are incorporated into an executable container file (or container DLL) that embodies the transformation(s) within one or more container files. Those of ordinary skill in the art will recognize that any number of other programming languages may be suitable for generating executable container files that embody the functionality of the transformations described herein (e.g., C#), and all such languages are within the scope of the present disclosure.

In at least some embodiments, the container file is an executable image that is designed to operate on representations of source files, rather than directly on the source code within the source files. As is described in more detail below, source code is translated from its native language into a representation that reflects the structure of elements within the source code, relationships between elements within the source code, and relationships between elements within the source code and elements external to and referenced by elements within the source code. Any of a number of languages may be used to express such representations, such as, for example the Extensible Markup Language (XML). Thus, for example, a web page applet written in Java® may be translated into an abstract syntax tree representation of the structure and relationships of the elements of the applet, wherein the representation is expressed as a collection of XML structures. Once the web page and/or web page program representation is expressed using XML, a transformation may be applied to the source code elements' structure and relationships representation by applying the transformation instructions encoded within transformation of the container file, which results in a modified XML description of the source code elements' structure and relationships representation. The modified XML description may then be translated back into its native form (e.g., Java®), completing the process.

Source code languages such as HTML and Java®, for example, may be used to represent source code that includes data, data presentation information and programs, the elements' structure and relationships of which are represented using either DOMs or ASTs, and may use transformation functions written using languages such as SSRL and encoded within one or more executable container file images. Nonetheless, those of ordinary skill in the art will recognize that a wide variety of source code types (e.g., HTML code, Active Server Page web application framework (ASP.NET) code, Cascading Style Sheet (CSS) code, Extensible Hypertext Markup Language (XHTML) code, XML code, Visual Basic.NET, C# programming language code and Java® programming language code), data/data presentation and program elements' structure and relationships representations (e.g., ASTs and DOMs), structure and relationships representation expressions (e.g., an AST expressed using XML) and transformation search patterns, instructions and description expressions (e.g., a transformation written in SSRL) may be used to implement the described systems and methods, and all such variations and combinations of source code types, element structure and relationships representations, element structure and relationships expressions, and transformation expressions are contemplated by the present disclosure.

Although the transformations embodied within an container file are designed to operate on a representation of the source code elements' structure and relationships, in at least some example embodiments the transformation function(s) may be written to operate on the source code, wherein the source code is subsequently translated during the compile process so as to operate on the representation of the source code, rather than on the source code directly. Although a transformation function may be written to operate directly on the representation of the source code directly (as described below), for some users it may be easier to visualize and conceptualize the search patterns and the transformation instructions relative to the original source code.

Figure 3:
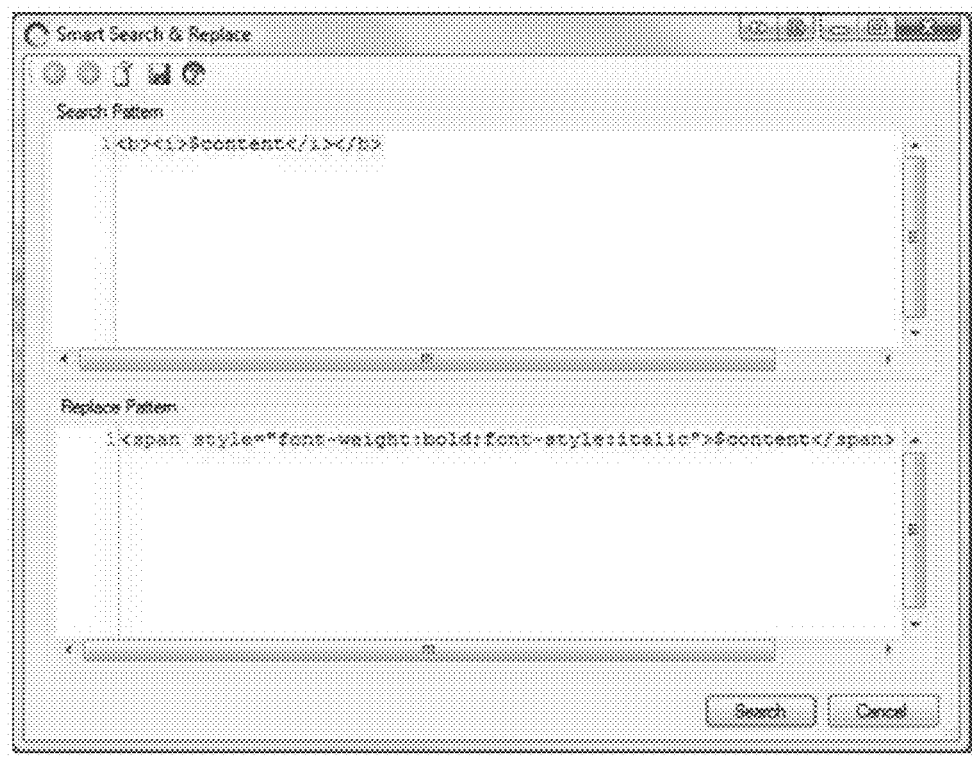
FIG. 3 shows an example of a user interface for entering search and replace strings used to generate executable code implementing a transformation within a container file, in accordance with at least some embodiments.

FIG. 3 shows an example of an SSRL search string (Search Pattern) that operates as a search pattern, and a corresponding SSRL replace string (Replace Pattern) that operates as the transformation instructions. Both the search string and the replace string of the example are written to operate on the source code rather than on the structure and relationships representation of the source code. As already noted, the search and replace strings are later translated during the compile process to operate on the representation of the source code (here, for example, to operate on an AST representing the structure and relationships of the elements of HTML source code). In the example shown, the search string is designed to find content that is displayed as bold and italicized text using the <b> and <i> HTML tags. The replace string operates to replace the tags with a tag-less style using the <span> tag, and uses the bound variable $content to capture and re-insert the content within the scope of the matched <b> and <i> tags between the <span> and </span> tags. As illustrated in FIG. 3, a user interface may be operated to accept input from a user that define both the search and replace strings. The search and replace strings are entered by a user and may be saved as part of a sequence of search and replace strings that are later compiled and saved as one or more transformation functions within a container file. Additional explanation text may also be entered using a similar user interface (not shown) for later display when an end-user receives and applies the transformation. The user interface shown may be implemented as an add-in module within an integrated development environment (e.g., Microsoft® Visual Studio) that is executed as generation software 112 on generation workstation 110 of FIG. 1.

Figure 4A:
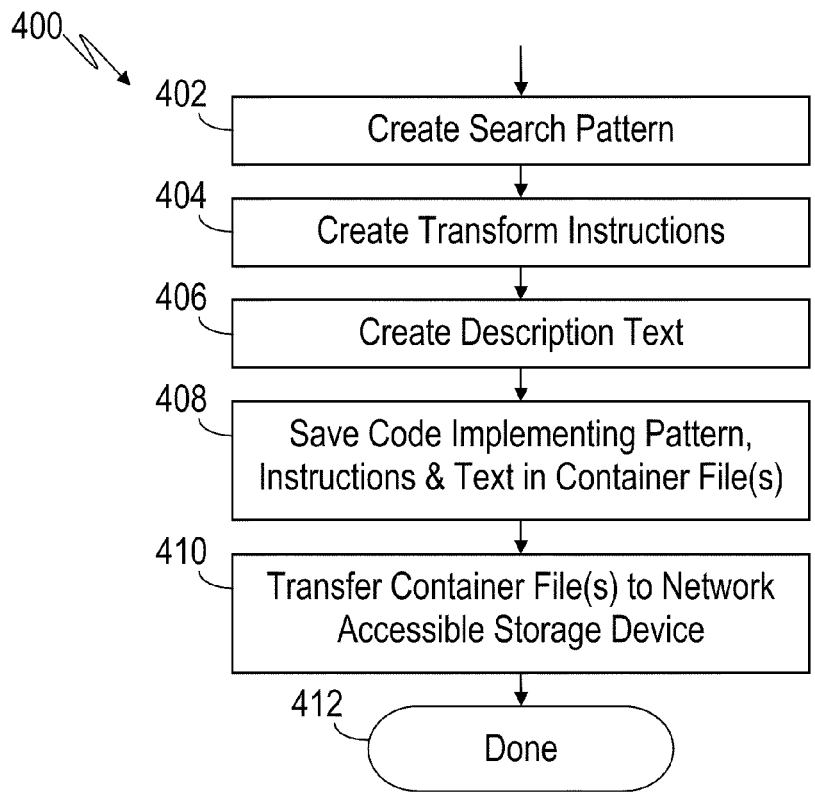
FIG. 4A shows a block diagram illustrating an example of a software-implemented method that executes on the container file generation workstation of FIG. 1 and generates a container file, in accordance with at least some embodiments.

FIG. 4A illustrates a flowchart of a method 400 for generating a container file that includes one or more transformations in accordance with at least some embodiments, and implemented by generation software 112 executing on generation workstation 110 of FIG. 1. Continuing to refer to FIG. 4A, executable code that implements a search pattern is created (block 402) that is designed to identify a code segment to be modified by matching the search pattern to one or more code segments. Such code segments are not necessarily contiguous and may represent only portions of a source code statement, or portions of several different source code statements. Further, the heuristics incorporated into the search pattern may be designed to identify a specific structure rather than an exact coding (e.g., not specific variable names, specific numbers or specific variable orderings). This is accomplished at least in part through the use of wildcard strings (e.g., the "$_" string or the "$_ . . . " string within SSRL) and bound variables (e.g., variables dynamically bound to values during a pattern search within SSRL). These wildcards operate as placeholders for any of zero or more elements (e.g., AST nodes), thus allowing for matches of the search pattern to source code segments that include not only the elements expressly described by the search pattern but also matches to source code segments that include additional elements. This enables the search pattern to identify relevant sections of the structure of a code segment, while ignoring other sections that may be present (and may have any number of elements) but that may have no bearing on either identifying or modifying the code segment.

The executable code implementing the search pattern created in block 402 of FIG. 4A may be created using an integrated development environment (as described above), or alternatively using text editing software (functioning as generation software 112) operated by a user and based upon a manual analysis of the structure and relationships representations (e.g., an AST of a C# program) of both the unmodified version of the source code and the modified version of the source code. These structure and relationships representations may be used to determine both the search pattern that identifies the structure and relationships representations to be modified in the original source code, as well as the specific edits (e.g., deletions, additions and replacements) to the identified structure and relationships representations needed to produce the modified version of the structure and relationships representation (e.g., to produce a modified AST), and to subsequently produce the resulting source code. Those of ordinary skill in the art will recognize that automated tools may be used for generating and displaying such structure and relationships representations (e.g., AST View, an Eclipse plug-in used to visualize a Java® AST), and all such tools are contemplated by the present disclosure.

After creating the code that implements the search pattern used to identify the relevant code segment(s), the user further operates the generation software (e.g., Microsoft® Visual Studio) to create executable code that implements the transformation instructions (block 404) needed to modify structure and relationships representation(s) of elements within the source code to create the modified version of the representation(s). The executable code may be derived from a translation of replace strings designed to operate directly on the source code (as described above), or derived from replace strings designed by the user to operate on said representations based upon the aforementioned analysis performed by the user. Those of ordinary skill in the art will again recognize that automated tools for comparing the unmodified representation(s) and the modified representation(s) (e.g., using the compare capability of Microsoft Word to compare XML-expressed ASTs and generate a list of differences) may be used to assist with or perform the creation of the transformation instructions, and all such tools are contemplated by the present disclosure.

In at least some example embodiments, after creating the executable code that implements the transformation instructions, the user then operates the generation software to create executable code that outputs description text (block 406) that provides such information as the reason for the transformation, the improvements that it provides, and contact information for of the person or organization originating the transformation, just to name a few examples. This information may be displayed to a user to assist in their decision of whether to apply the transformation to the source code, or stored for future reference. The user then operates the generation software to save the created code that implements the search pattern, the transformation instructions and the output of description text as at least part of one or more container files (block 408), which is then transferred to a network-accessible storage device (block 410), ending the method (block 412). Although the method described indicates that the file is first saved and then transferred, in other embodiments the save of the container file may be performed as a single operation (not shown) directly onto the network-accessible network storage device. Also, as previously noted, the network-accessible storage device may be part of a separate server (e.g., server 130 of FIG. 1) or part of an embodiment of generation workstation 110 that also implements the functionality of server 130.

Method 400 thus produces a container file that operates as an executable image that includes one or more self-contained transformations that each includes: the search pattern necessary to identify the structure of one or more code segments targeted by the transformation; the transformation instructions necessary to perform the actual conversion of the source code into the modified version of the source code; and text describing details of interest about the transformation so applied. Because both the search pattern and transformation instructions are provided within a transformation, the application of the transformation (if applied using both the search pattern and transformation instructions provided) will be consistent across a given user community receiving and applying the transformation. Additionally, the search pattern is developed by the entity generating the transformation (frequently the most competent entity to do so), allowing users to immediately apply the transformation without having to spend time analyzing the unmodified source code and the transformation to determine the appropriate search pattern and transformation instructions needed to apply the transformation, thus enabling faster incorporation of the knowledge capsules embodied within a transformation into operational use.

Figure 4B:
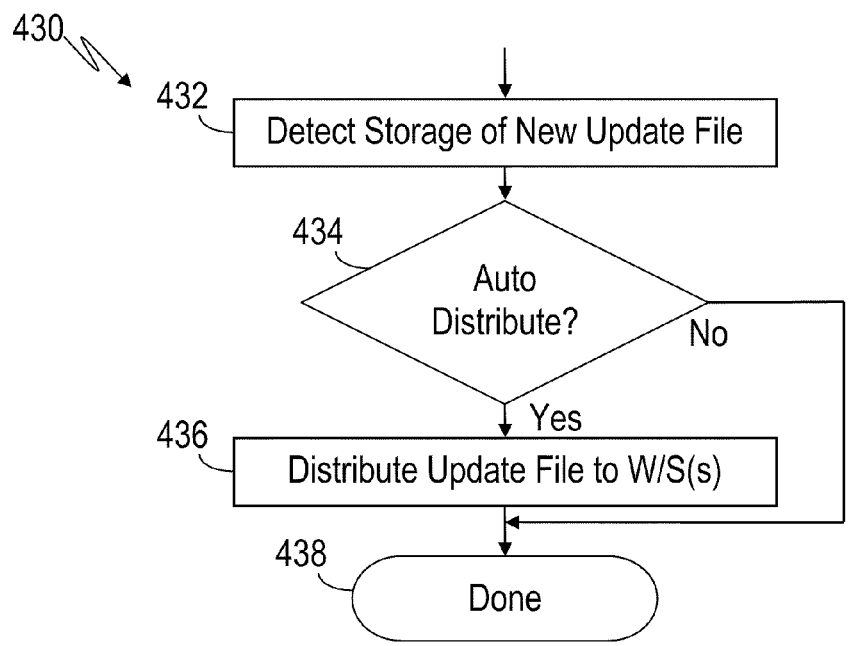
FIG. 4B shows a block diagram illustrating an example of a software-implemented method that executes on the container file server of FIG. 1 and automatically distributes a container file to one or more source code editing workstations, in accordance with at least some embodiments.

Once container file is saved to a network-accessible storage device, such as storage device 140 within server 130 of FIG. 1, distribution software may be executed on server 130 that automatically distributes container files saved on storage device 140 to one or more editing workstations, such as editing workstation 150 of FIG. 1. FIG. 4B illustrates a flowchart of a method 430 for automatically distributing container file containing one or more transformations in accordance with at least some embodiments, and implemented by distribution software 134 executing on server 130 of FIG. 1. Distribution software 134 detects when a container file has been saved onto the storage device (block 432), which may be performed by detecting the actual storage operation initiated by generation software 112 as the operation takes place, or by periodically checking for additional container files that have been saved to storage device since the last check. When an added container file is detected, if automatic distribution of the container file(s) is enabled (block 434) the file(s) is/are distributed (block 436) to one or more editing workstations (e.g., editing workstation 150 of FIG. 1) based upon a distribution list maintained by distribution software 134 (e.g., maintained within a file stored on storage device 140 of FIG. 1). Once the file(s) is/are distributed, or if automatic distribution is not enabled, the method completes (block 438).

Figure 4C:
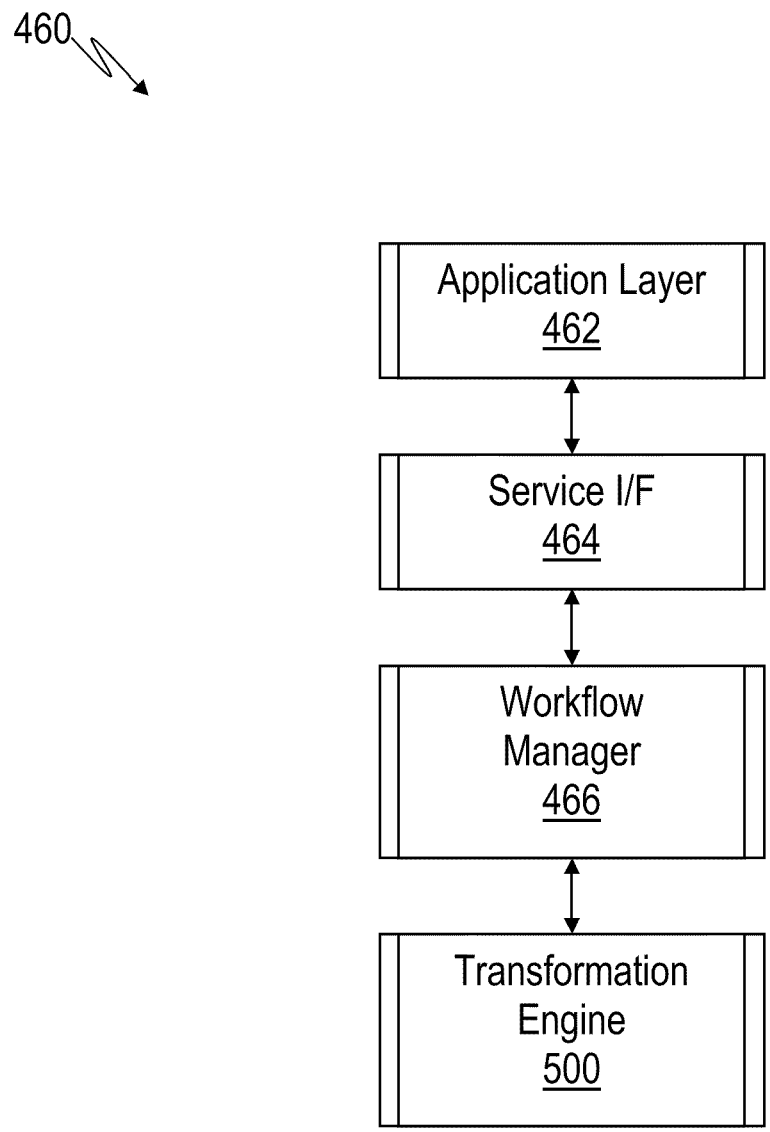
FIG. 4C shows a block diagram illustrating an example of software executing on the source code editing workstation of FIG. 1 for applying transformations to source code files, in accordance with at least some embodiments.

FIG. 4C illustrates a functional block diagram 460 of source code modification software 156 executing on generation workstation 150 of FIG. 1, which applies a transformation to source code within a source code file in accordance with at least some embodiments. An application layer 462 operates as the interface between the user and the source code modification software. This application layer may be provided by source code modification software 156 of FIG. 1 executing as a standalone application, or may be provided by IDE software 154 of FIG. 1 within which source code modification software 156 executes as an add-on module (e.g., as an add-on within Microsoft® Visual Studio). Referring again to FIG. 4C, application layer 462 interacts with service interface 464, which acts an abstraction layer that isolates application layer 462 from the implementation details of transformation engine 500, and which exposes the functionality of transformation engine 500 as a one or more services invoked by application layer 462.

Service interface 464 interacts with workflow manager 466, which coordinates and tracks the operations initiated by application layer 462 through service interface 464, and provides the results of the operations performed by transformation engine 500 to service interface 464. Workflow manager 466 interacts with transformation engine 500, which applies one or more transformations, to source code within a source code file, as described in detail below.

Figure 5:
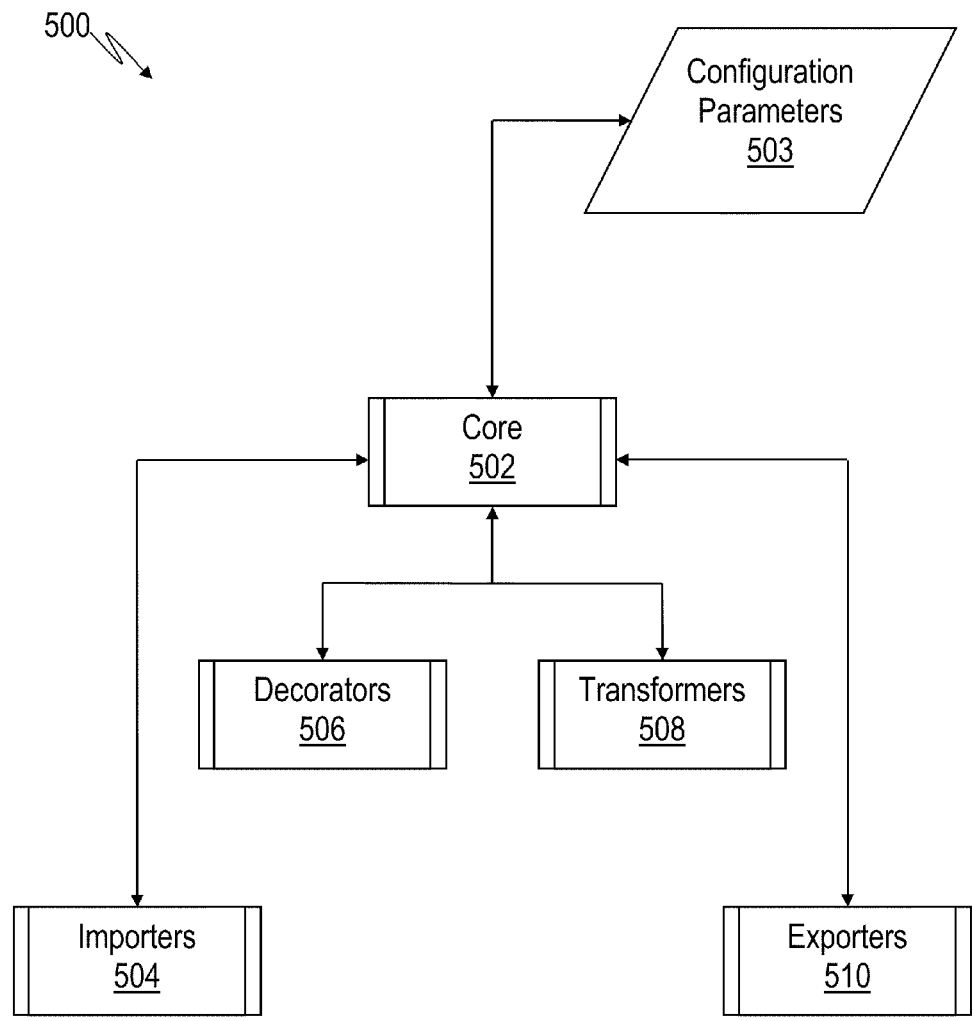
FIG. 5 shows a block diagram illustrating an example of the transformation engine of FIG. 4C, in accordance with at least some embodiments.

FIG. 5 illustrates a functional block diagram of transformation engine 500, in accordance with at least some embodiments. Core 502 determines what operation has been requested by workflow manager 466 of FIG. 4C and initiates the requested operation according to configuration parameters 503 and/or other user-supplied constraints. Such parameters and constraints may include date ranges and transformation types that limit the selection of transformations presented to a user for selection, whether the transformations are immediately applied or subject to acceptance/rejection by the user, and how the effect of the transformations to the source code are presented to the user (e.g., using side-by-side before and after windows, or using a single window to display the modified code with change notations), just to name a few examples.

Continuing to refer to FIG. 5, when a transformation is applied, the unmodified source code is parsed by one of importers 504. Transformation engine 500 can include multiple importers, wherein each importer is designed to operate on different types of source code. Thus, one importer is designed to operate on source code written in the Java® programming language, while another importer is designed to operate on HTML source code. The parsing of the source code by an importer 504 produces either an AST (for program source code, e.g., C# code) or a DOM (for data and data presentation source code, e.g., XML and HTML). Those of ordinary skill in the art will recognize that other importers may be developed to parse a variety of different languages to produce a variety of different structure and relationships representations (not just ASTs and DOMs), and all such importers, languages and structure and relationships representations are contemplated by the present disclosure.

The initial structure and relationships representation produced by an importer 504, whether an AST or a DOM, is processed by one or more decorators 506, which provides further analysis (e.g., semantic analysis) of the initial representation produced by an importer 504 and augments the information stored within the representation with additional information resulting from the analysis. Specific techniques for parsing, generating and decorating ASTs and DOMs are well known in the art and are not discussed further herein.

The decorated AST or DOM produced by decorators 506 of the example embodiment of FIG. 5 is then processed by one or more transformers 508. Each transformer modifies the decorated AST or DOM representation of the structure and relationships of the source code elements to reflect the application of a corresponding transformation selected by a user. The modified representation is then translated back into the original source code language by one of exporters 510 corresponding to that language. The resulting modified source code is then provided by core 502 back to the user to be reviewed, and/or to be either committed to the final modified source code file or discarded.

As already noted editing workstation 150 of FIG. 1 receives one or more container files from server 130 (or alternatively from an embodiment of generation workstation 110 that includes the functionality of server 130). These container file(s) may be automatically pushed to editing workstation 150 by software executing on server 130, or pulled (automatically or manually) from server 130 by software executing on editing workstation 150 (e.g., using a web browser such as Microsoft® Internet Explorer, or using IDE software 154 and/or source code modification software 156 of FIG. 1). The software that executes on editing workstation 150 may be part of a stand-alone agent executing in background that processes a container file upon receipt or that periodically executes and processes any container file(s) received since the last execution cycle. Alternatively, the software executing on workstation 150 that processes received container files may be part of source code modification software 156 of FIG. 1 (e.g., part of core 502 of FIG. 5), executing on demand when so commanded by a user.

Figure 6:
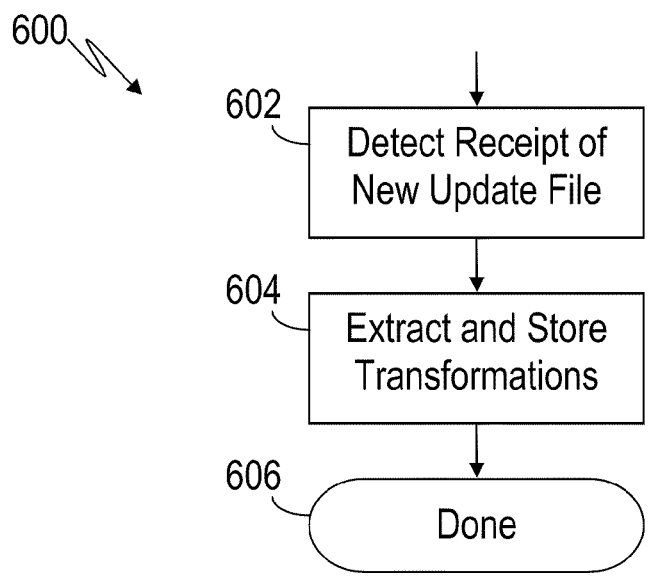
FIG. 6 shows an example of a software-implemented method for extracting and storing transformations, in accordance with at least some embodiments.

FIG. 6 illustrates a flowchart of a method 600 for processing a container file received at editing workstation 150, implemented by software executing on editing workstation 150 (either as part of the aforementioned stand-alone agent (not shown) or as part of core 502 of FIG. 5) in accordance with at least some embodiments. Continuing to refer to FIG. 6, receipt of one or more container files is detected (block 602) and each received file is accessed for processing. Each container file may contain one or more transformations, each of which is extracted from the file. Each of the transformations are extracted from the container file and saved onto a storage device (block 604), such as storage device 162 of FIG. 1, completing the method (block 606). In at least some embodiments the transformations are each saved as part of a database or library (not shown), where it can be accessed, categorized, listed and searched using any of a number of known database manipulation techniques. The database or library of transformations may be accessed by source code modification software 156, allowing the user to search and select the transformations to apply to the source code. In other embodiments, the container file is saved as a registered DLL, and each transformation is made accessible as one or more functions within the registered DLL. In still other embodiments, each transformation is stored within a separate container file (e.g., either as an executable program or a DLL).

Figure 7:
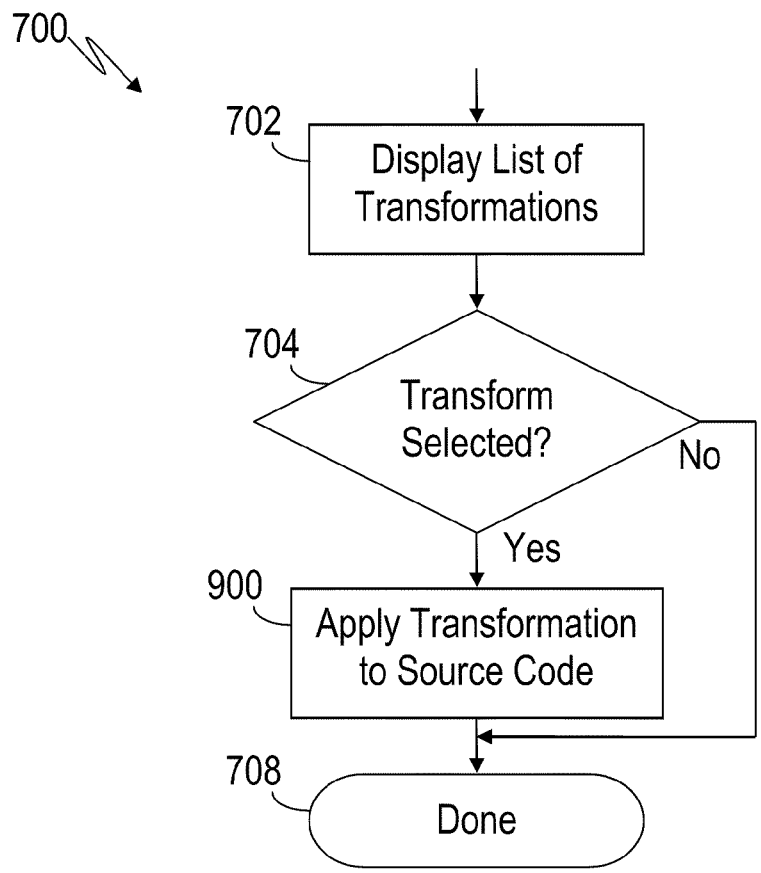
FIG. 7 shows an example of a software-implemented method for applying a single transformation to a source code file, in accordance with at least some embodiments.

FIG. 7 shows a flowchart of a method 700 for applying a single transformation to source code within a source code file, implemented by source code modification software 156 of FIG. 1 in accordance with at least some embodiments. A list of transformation available for selection (e.g., stored and available on the aforementioned transformation database) is presented to a user (block 702). The list may include all available transformations, or may be a filtered list that includes only some of the available transformations. The filtering may be performed based on one or more constraints specified by the user when initiating the application of one or more transformations to source code within a source code file, or may be based upon previously specified and saved configuration parameters (e.g., configuration parameters 503 of FIG. 5).

The user selects from the displayed list the transformation to be applied to the source code. If a transformation is selected (block 704) then the selected transformation is applied to the source code file (block 900). Once the selected transformation has been applied, or alternatively if no transformation is selected, the method completes (block 708). The transformation is applied to source code based at least in part on code segments that are either flagged by the user prior to invoking the transformation, or that are flagged automatically as code segments matched by the search pattern associated with the transformation. The details of the processing performed in block 900 are shown in more detail in FIG. 9, and described further below.

Figure 8:
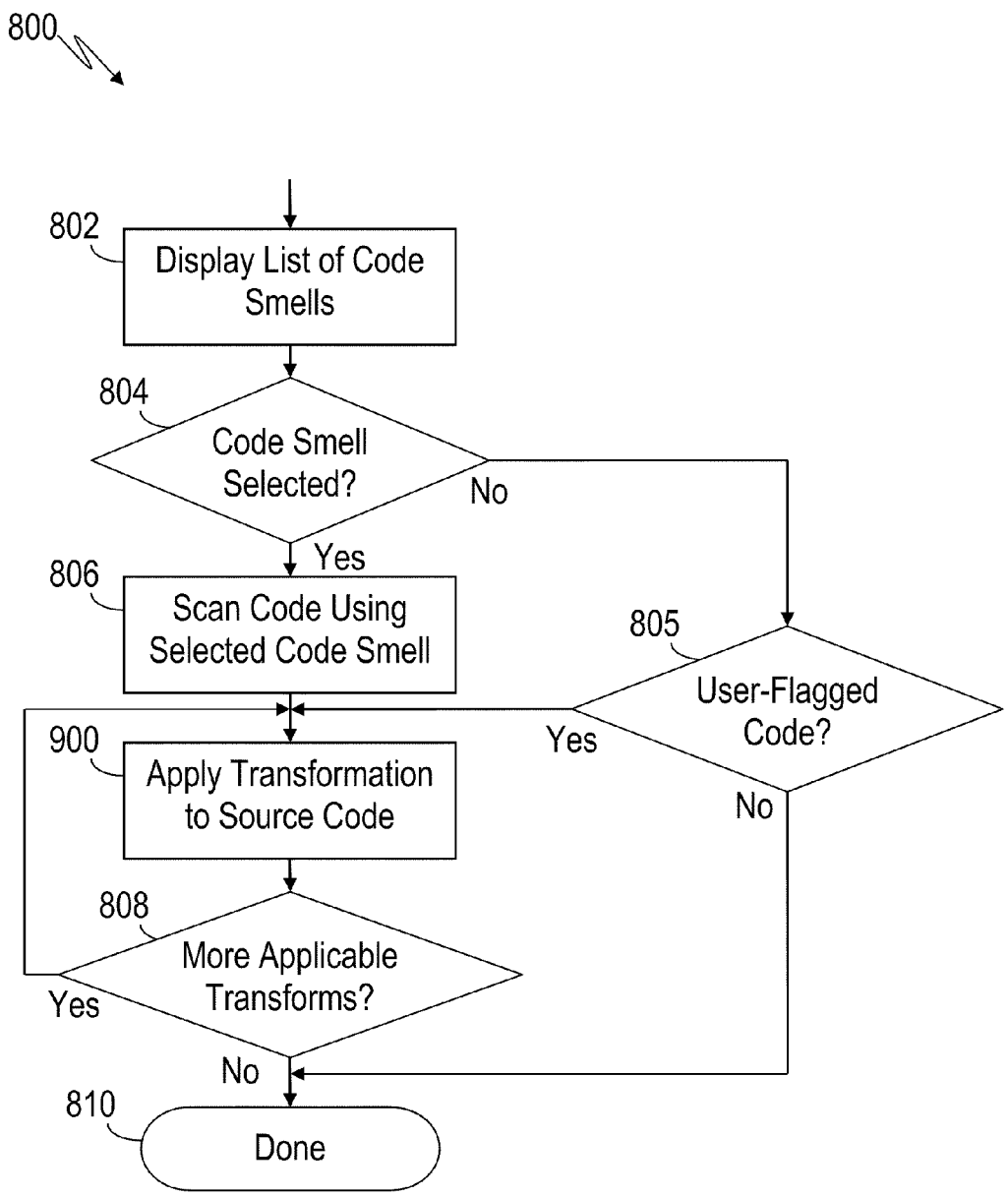
FIG. 8 shows an example of a software-implemented method for applying multiple transformations to a source code file, in accordance with at least some embodiments.

FIG. 8 shows a flowchart of a method 800 for applying multiple transformations to source code within a source code file, implemented by source code modification software 156 of FIG. 1 in accordance with at least some embodiments. A list of "code smells" (i.e., search patterns for identifying a code segment that may help identify source code that may be a candidate for application of the associated transformation) are displayed to a user for selection (block 802), and the user selects those code smells to be applied to the source code file. If a code smell is selected (block 804), the selected code smell is used to scan for occurrences within the source code that the code smell matches, i.e., where the transformation search pattern matches one or more source code segments (block 806), and matching code segments (i.e., code segments that identify the source code as a candidate for application of a transformation) are flagged. Once the code has been scanned using the code smells, or if no code smells are selected (block 804) but the user has manually flagged code segments (block 805), the transformations are applied to the source code (block 900) until all applicable transformations have been processed (block 808). The method completes (block 810) after all transformations have been processed (block 808) or if no code smells are selected (block 804) and the user has not manually flagged any code segments (805).

Figure 9:
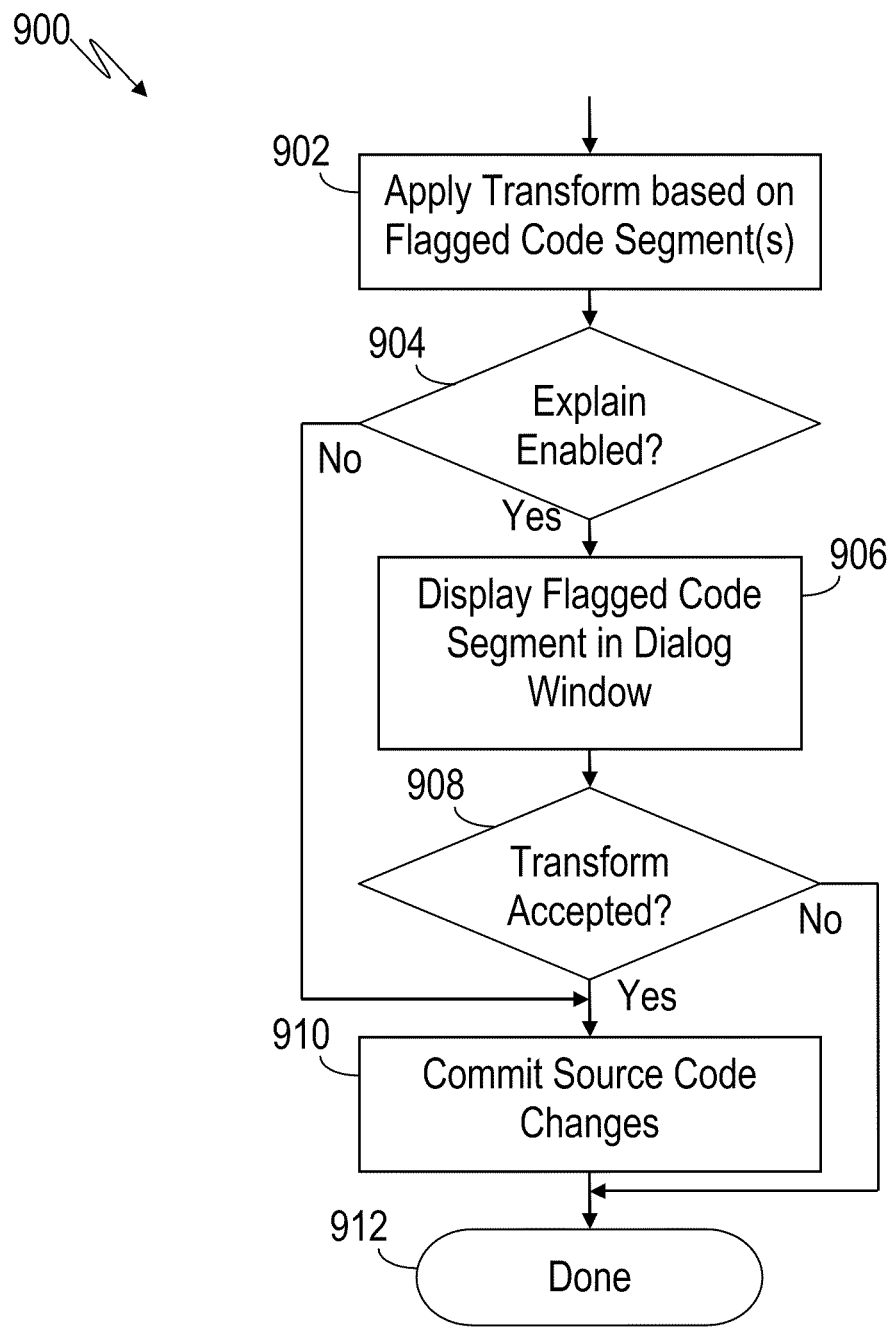
FIG. 9 shows an example of a method, implementing block 900 of both FIGS. 7 and 8, for applying transformations to source code in accordance with at least some embodiments.

FIG. 9 illustrates a flowchart of a method 900 for applying transformations to source code based at least in part on the code segments flagged by either of methods 700 and 800 of FIGS. 7 and 8 respectively, implemented by source code modification software 156 of FIG. 1 in accordance with at least some embodiments. Once a source code segment is flagged, the transformation instructions associated with the transformation are applied to the source code, based at least in part on the flagged code segment, to produce the modified source code (block 902). However, the modified source code is not committed (i.e., not saved to the copy of the source file stored on storage device 162). If the "Explain" option is enabled (block 904), a window is presented to the user (shown in FIG. 10 and described below) allowing the user to see how the transformation instructions will alter the flagged source code (block 906). This information assists the user in deciding whether to commit the changes made by the transformation. If the user accepts the transformation (block 908), the changes to the source code are committed (block 910), i.e., is saved as part of the modified source code file, completing the method (block 912). If the changes to the source code is not accepted (block 908), the transformation is not committed and the method ends (block 912). If the explain option is not enabled (block 904), the transformation is automatically committed by default (block 910), and the method completes (block 912).

Figure 10:
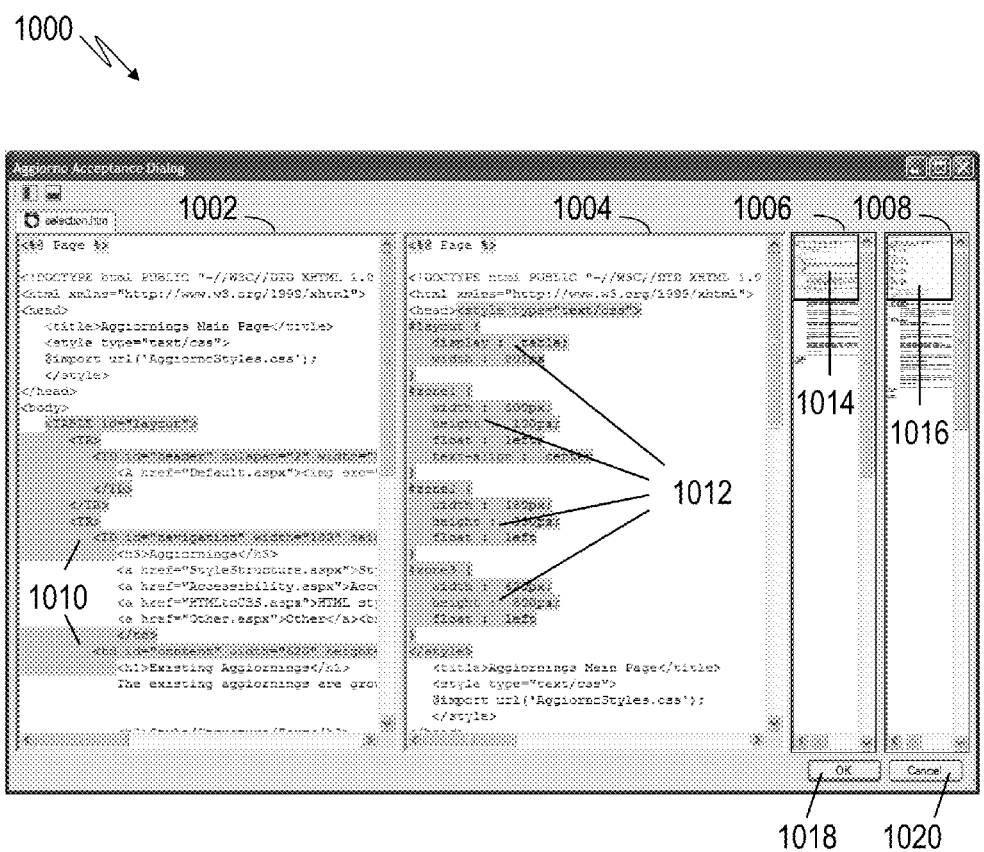
FIG. 10 shows an example of an "Explanation/Acceptance" dialog window, in accordance with at least some embodiments.

FIG. 10 illustrates an example of an explanation/acceptance dialog window 1000 for accepting or rejecting changes to the source code, in accordance with at least some embodiments. In left scrollable window 1002 the user is presented with the original source code with flagged code segment 1010 highlighted, while in right scrollable window 1004 the modified source code is shown with modified replacement code segments 1012 highlighted. In the example shown, style information that is embedded within an HTML tag has been flagged within the original source code and will be converted into separate HTML code and associated CSS styles. Scrollable windows 1006 and 1008 respectively show overviews of the unmodified source code and the modified source code, with window indicators 1014 and 1016 tracking the respective locations of windows 1002 and 1004 within the unmodified source code and the modified source code. If a user decides to accept (and thus commit) the transformation shown, OK button 1018 is clicked. Cancel button 1020 is clicked by the user to reject the transformation and thus prevent changes to the highlighted source code from being committed to the modified source code file. In other embodiments (not shown) a single scrollable window is presented to the user that displays the source code with the modified code highlighted, but with the changes indicated using change notation such as, for example, strikethroughs to indicate deletions and underlining to indicated additions. A second window may also be presented to show the location of the scrollable window within the source code similar to windows 1006 and 1008.

In other embodiments, the user may have the option of requesting the display of additional information when the explanation/acceptance dialog window is displayed, but before accepting or rejecting the transformation. When such information is requested, a message box (not shown) is presented to the user that displays the text description associated with the transformation. An "OK" button within the message box allows the user to clear the message box and proceed with either accepting or rejecting the transformation.

The above discussion is meant to illustrate the principles of at least some embodiments. Other variations and modifications will become apparent to those of ordinary skill in the art once the above disclosure is fully appreciated. For example, although the embodiments described operate within the context of a system that exchange source code container files across a communication network, other embodiments may include systems that exchange source code container files using removable media such as CD-ROMs and memory sticks. Also, although acceptance dialog window 1000 of FIG. 10 includes windows presented horizontally (i.e., side-by-side), other embodiments of the dialog window can include widows presented vertically, while still other embodiments may enable the user to switch between different dialog window organizations. Further, although the embodiments present describe modifying and saving an existing source file, other embodiments may save the modified version of the source code as a separate new file, and still other embodiments may create new source code files (in addition to the modified source code file) as a result of a applying a transformation. It is intended that the following claims be interpreted to include all such variations and modifications.

What is claimed is:

1. A system for creating, storing, and disseminating transformations in a container file and applying the transformations on source code files, comprising:
   a processing logic;
   a storage device, coupled to the processing logic; and
   a communication interface coupled to the processing logic and configured to couple to a communication network, wherein software executing on the processing logic causes generation of the container file, the container file being transmitted to a server computer by the communication interface;
   wherein the server computer comprises:
      a server processing logic;
      a server storage device; and
      a server communication interface coupled to the server processing logic and configured to couple to the communication network;
   wherein the container file is received by the server communication interface and stored on the server storage device, and software executing on the server processing logic exposes the container file to the communication network for access by one or more client computers;
   wherein at least one of the one or more client computers comprises:
      a client computer processing logic;
      a client computer storage device coupled to the client computer processing logic, which comprises one or more source code files comprising source code; and
      a client computer communication interface coupled to the client computer processing logic and configured to couple to the communication network;
   wherein the client computer communication interface receives the container file, the container file comprising a transformation that comprises:
      a search pattern used to identify one or more code segments of the source code; and
      one or more transformation instructions used to modify the source code without modifying existing functionality of the source code, the modification being based at least in part on the one or more identified code segments in the one or more source code files;
   wherein software executing on the processing logic searches a representation of the structure and relationships of elements of the source code for occurrences of the search pattern, and identifies the one or more code segments of the one or more source code files comprising elements with a structure and relationships that are matched by the corresponding elements represented by the search pattern; and
   wherein the software further modifies at least part of the representation of the structure and relationships of the elements of the source code according to the one or more transformation instructions, and further saves onto the storage device one or more source code files that reflect the application of the transformation to the source code.

2. The system of claim 1, the client computer further comprising:
   a display device, coupled to the processing logic, which presents information to a user operating the client computer; and
   an input device, coupled to the processing logic, which accepts information provided by the user;
   wherein the source code is concurrently presented twice to the user on the display device, one presentation reflecting the source code before application of a transformation and the other presentation reflecting the source code after application of the transformation; and
   wherein the software modifies the source code when the user signals acceptance of the application of the transformation through the input device.

3. The system of claim 1, the client computer further comprising:
   a display device, coupled to the processing logic, which presents information to a user operating the client computer; and
   an input device, coupled to the processing logic, which accepts information provided by the user;
   wherein the source code is presented to the user on the display device as it appears after application of the transformation, with changes indicated on the display device relative to the source code as it appeared before application of the transformation; and
   wherein the software modifies the source code when the user signals acceptance of the application of the transformation through the input device.

4. The system of claim 1, wherein the source code comprises at least one type of code selected from the group consisting of data structure source code, data presentation source code, and program source code.

5. The system of claim 1, wherein the source code comprises at least one type of code selected from the group consisting of Hypertext Markup Language (HTML) code, Active Server Page web application framework (ASP.NET) code, Cascading Style Sheet (CSS) code, Extensible Hypertext Markup Language (XHTML) code, Extensible Markup Language (XML) code, Visual Basic.NET, C# programming language code and Java® programming language code.

6. The system of claim 1, wherein the representation of the structure and relationships of the elements of the source code is structured as either an Abstract Syntax Tree (AST) or as a Document Object Model (DOM).

7. The system of claim 1, wherein the transformation further comprises executable code that implements the search pattern and the one or more transformation instructions.

8. The system of claim 1, wherein the transformation further comprises executable code that extracts and outputs text, encoded within the transformation, describing the changes implemented by the transformation instructions.

9. The system of claim 1,
wherein the search pattern comprises one or more wildcard characters that operate to mask corresponding elements of the one or more code segments from the application of the search pattern; and
wherein the structure and relationships of the elements of the one or more code segments are matched by the corresponding elements represented by the search pattern if any nonmatching elements of the one or more code segments are each masked by at least one of the one or more wildcard characters.

10. The system of claim 1, wherein the transformation is selected for use by the user by selecting, through the input device, the transformation from a list of one or more transformations presented to the user on the display device.

11. The system of claim 1, wherein the software executing on the server processing logic initiates transmission of the container file from the server computer to the client computer.

12. The system of claim 1, wherein the software executing on the client processing logic initiates transmission of the container file from the server computer to the client computer.

13. A method comprising:
receiving from a server computer via a communication network an executable container file comprising one or more transformations, the container file generated on a container-generating computer and transmitted and stored on the server computer;
selecting at least one of the one or more transformations comprising a search pattern used to identify one or more source code segments and one or more transformation instructions used to modify one or more of the source code without modifying existing functionality of the source code, the modification being based at least in part on the one or more identified source code segments;
applying the search pattern to a representation of the structure and relationships of the elements of source code stored within a source code file to identify one or more code segments within the source code comprising elements with a structure and relationships that are matched by the structure and relationships of corresponding elements represented by the search pattern;
modifying a representation of the structure and relationships of elements of the source code according to the transformation instructions without modifying existing functionality of the source code, the modifications being based at least in part on the one or more identified code segment; and store one or more source code files that reflect the application of the transformation to the source code.

14. The method of claim 13, further comprising parsing the source code to generate the representation of the structure and relationship of the elements of the source code.

15. The method of claim 13, further comprising storing the transformation.

16. The method of claim 13, further comprising structuring the representation of the structure and relationships of the elements of the source code as either an Abstract Syntax Tree (AST) or as a Document Object Model (DOM).

17. The method of claim 13, further comprising:
displaying two versions of the source code to a user, one version reflecting the source code before applying the transformation and the other version reflecting the source code after applying the transformation; and
accepting an input that signals the user's acceptance of the application of the transformation, and causes application of the transformation to the source code.

18. The method of claim 13, further comprising:
displaying the source code to a user as it appears after applying the transformation, with changes indicated relative to the source code as it appeared before applying the transformation; and
accepting an input that signals the user's acceptance of the application of the transformation, and causes the application of the transformation to the source code.

19. The method of claim 13, further comprising displaying or storing text describing the changes implemented by the transformation instructions, wherein the transformation further comprises executable code that accesses and extracts the text encoded within the transformation.

20. The method of claim 13, further comprising:
including in the search pattern one or more wildcard characters that operate to mask corresponding elements of the one or more code segments from the application of the search pattern; and
matching the structure and relationships of elements of the one or more code segments to the corresponding elements represented by the search pattern if any nonmatching elements of the one or more code segments are each masked by at least one of the one or more wildcard characters.

21. A non-transitory computer-readable storage medium comprising software that can be executed on a processor to cause the processor to:
generate an executable container file configured to modify source code stored within one or more source code files without modifying existing functionality of the source code, the container file comprising a transformation that comprises:
a search pattern used to identify one or more code segments comprising elements with a structure and relationships that are matched by the structure and relationships of corresponding elements represented by the search pattern; and
one or more transformation instructions that operate to modify source code based at least in part on the one or more identified code segments without modifying existing functionality of the source code;
save the container file to a storage device that is accessible over a communication network; and
initiate the transmission of the saved container file across the network to a server computer comprising a second processor, wherein the executable container file when executed by a client computer searches a representation of the structure and relationships of elements of source code contained in one or more source code files for occurrences of the search pattern, and identifies the one or more code segments of the one or more source code files comprising elements with a structure and relationships that are matched by the corresponding elements represented by the search pattern, and wherein the executable container file when executed by the client computer modifies at least part of the representation of the structure and relationships of the elements of the source code according to the one or more transformation instructions and saves one or more source code files that reflect application of the transformation to the source code.

22. The non-transitory computer-readable storage medium of claim 21, wherein the software further causes the processor to express the search pattern and the one or more transformation instructions, included within the container file, as executable code.

23. The non-transitory computer-readable storage medium of claim 21, wherein the software further causes the processor to:
- include in the search pattern one or more wildcard characters that operate to mask corresponding elements of the one or more code segments from the application of the search pattern; and
- wherein the structure and relationships of the elements of the one or more code segments are matched by the corresponding elements represented by the search pattern if any nonmatching elements of the one or more code segments are each masked by at least one of the one or more wildcard characters.

24. The non-transitory computer-readable storage medium of claim 21,
- wherein a second computer-readable storage medium comprises additional software that causes the second processor to initiate the re-transmission of the saved container file across the network to a client computer for use by a client processor within the client computer executing software that is configured to apply the container file to the one or more source code files.

* * * * *